(12) United States Patent
Nakanishi et al.

(10) Patent No.: US 8,729,194 B2
(45) Date of Patent: May 20, 2014

(54) POLYURETHANE RESIN

(75) Inventors: Gun Nakanishi, Takatsuki (JP); Shinya Ushiama, Takatsuki (JP); Masahiro Ito, Takatsuki (JP)

(73) Assignee: Sunstar Giken Kabushiki Kaisha, Osaka (JP)

( * ) Notice: Subject to any disclaimer, the term of this patent is extended or adjusted under 35 U.S.C. 154(b) by 0 days.

(21) Appl. No.: 13/634,369

(22) PCT Filed: Mar. 4, 2011

(86) PCT No.: PCT/JP2011/055080
§ 371 (c)(1),
(2), (4) Date: Oct. 18, 2012

(87) PCT Pub. No.: WO2011/114911
PCT Pub. Date: Sep. 22, 2011

(65) Prior Publication Data
US 2013/0035453 A1    Feb. 7, 2013

(30) Foreign Application Priority Data

Mar. 17, 2010   (JP) ................................. 2010-060779

(51) Int. Cl.
*C08G 18/83* (2006.01)
*C08G 18/12* (2006.01)

(52) U.S. Cl.
USPC ...................................................... 525/460

(58) Field of Classification Search
None
See application file for complete search history.

(56) References Cited

U.S. PATENT DOCUMENTS

| | | |
|---|---|---|
| 4,857,623 A | 8/1989 | Emmerling et al. |
| 5,068,304 A | 11/1991 | Higuchi et al. |
| 5,554,709 A | 9/1996 | Emmerling et al. |
| 6,265,517 B1 | 7/2001 | Stuart |
| 6,305,143 B1 * | 10/2001 | Streets et al. .............. 52/746.11 |
| 6,498,210 B1 | 12/2002 | Wang et al. |
| 6,531,566 B1 | 3/2003 | Satake |
| 7,365,145 B2 * | 4/2008 | Yang et al. ...................... 528/29 |
| 2002/0128419 A1 | 9/2002 | Terry et al. |
| 2004/0097682 A1 | 5/2004 | Frisch et al. |
| 2004/0127670 A1 | 7/2004 | Roesler et al. |
| 2004/0127671 A1 | 7/2004 | Roesler et al. |
| 2004/0132949 A1 | 7/2004 | Roesler et al. |
| 2004/0132950 A1 | 7/2004 | Roesler et al. |
| 2006/0173140 A1 | 8/2006 | Roesler et al. |
| 2007/0060732 A1 * | 3/2007 | Yang et al. ...................... 528/44 |
| 2010/0286344 A1 * | 11/2010 | Sunayama et al. ............ 525/452 |

FOREIGN PATENT DOCUMENTS

| | | |
|---|---|---|
| JP | 63-68625 A | 3/1988 |
| JP | 3-47825 | 2/1991 |
| JP | 3-157424 | 7/1991 |
| JP | 6-500585 A | 1/1994 |
| JP | 3-076032 | 6/2000 |
| JP | 2000-169544 | 6/2000 |
| JP | 2007-510764 A | 4/2007 |
| JP | 2007-510765 A | 4/2007 |
| JP | 2007-510766 A | 4/2007 |
| JP | 2007-211040 A | 8/2007 |
| JP | 2007-525567 A | 9/2007 |
| JP | 2007-526355 A | 9/2007 |
| JP | 2007-526356 A | 9/2007 |
| WO | WO-2009104700 A1 * | 8/2009 ............ C08L 101/10 |

* cited by examiner

*Primary Examiner* — Robert S Loewe
(74) *Attorney, Agent, or Firm* — Jacobson Holman, PLLC

(57) ABSTRACT

An object of the present invention is to provide a non-solvent type polyurethane resin which may be preferably used for a curing composition having physical properties after curing of low modulus and high elongation and which is excellent in adhesion, physical properties, handling property and storage stability and a process for producing the polyurethane resin without difficulty and at low cost. The polyurethane resin is obtained by reacting a urethane prepolymer obtained by reacting a mixture of a monool and a polyol, having on average 1.3 to 2.1 of terminal hydroxyl groups, and a polyisocyanate, and a compound having a crosslinkable silyl group, an imino group and an amino group in a molecule.

6 Claims, No Drawings

POLYURETHANE RESIN

This is a national stage of PCT/JP11/055080 filed Mar. 4, 2011 and published in Japanese, which has a priority of Japanese no. 2010-060779 filed Mar. 17, 2010, hereby incorporated by reference.

FIELD OF THE INVENTION

The present application claims the Paris Convention priority based on Japanese Patent Application No. 2010-60779 filed on Mar. 17, 2010, the entire content of which is incorporated herein by reference.

The present invention relates to a polyurethane resin. In particular, the present invention relates to a non-solvent type polyurethane resin which may be preferably used for a curable composition having physical properties of low modulus and high elongation and which is excellent in adhesion, physical properties, handling property and storage stability and a production process thereof.

BACKGROUND ART

In the past, it has been known that a polyurethane resin produced from a urethane prepolymer in which a silane compound having an amino group in a molecule is added to the terminal is excellent in physical properties such as elongation and toughness since the polyurethane resin has a urethane link and a urea link in a molecular chain (see, for example, Patent Documents 1 and 2). However, in the above-mentioned polyurethane resin, the prepolymer is alkaline due to a secondary amino group which remains in the prepolymer, and thereby a hydrolysis of an alkoxysilyl group proceeds. As a result, gelation occurs or viscosity increases and a problem such as poor storage stabilty arises.

As a process for eliminating an amino group which is alkaline, a process in which a silane compound having an amino group is added to an α-β-unsaturated carbonyl compound to form an alkoxysilane compound, and subsequently, the alkoxysilane compound is added to a urethane prepolymer is proposed (see, for example, Patent Document 3). However, when a polyurethane resin having low modulus and high elongation is produced by the above-mentioned process, the viscosity of the polyurethane resin increases and the handling property deteriorates. In addition, the production process is complex and expensive.
Patent Document 1: JP-A-03-047825
Patent Document 2: JP-A-03-157424
Patent Document 3: JP-A-2000-169544

SUMMARY OF THE INVENTION

An object of the present invention is to provide a non-solvent type polyurethane resin which may be preferably used for a curable composition having physical properties after curing of low modulus and high elongation and which is excellent in adhesion, physical properties, handling property and storage stability and a process for producing the polyurethane resin without difficulty and at low cost.

The present inventors have found that the object is accomplished by a polyurethane resin obtained by reacting a urethane prepolymer obtained by reacting a mixture of a monool and a polyol, having on average 1.3 to 2.1 of the terminal hydroxyl groups, and a polyisocyanate, and a compound having a crosslinkable silyl group, an imino group and an amino group in a molecule.

The present invention is intended to provide the following embodiments.
[1] A polyurethane resin obtained by reacting
(1) a urethane prepolymer obtained by reacting
(a) a mixture of a monool and a polyol, having on average 1.3 to 2.1 of terminal hydroxyl groups, and
(b) a polyisocyanate, and
(2) a compound having a crosslinkable silyl group, an imino group and an amino group in a molecule, of the following formula I:

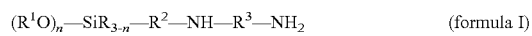
$$(R^1O)_n\text{—}SiR_{3-n}\text{—}R^2\text{—}NH\text{—}R^3\text{—}NH_2 \quad \text{(formula I)}$$

wherein R represents a methyl group or an ethyl group,
$R^1$ represents a methyl group or an ethyl group,
$R^2$ represents a hydrocarbon group having 2-10 carbon atoms,
$R^3$ represents a hydrocarbon group having 2-10 carbon atoms.
[2] The polyurethane resin according to [1], the polyol has a number-average molecular weight (Mn) of 500 to 30000.
[3] The polyurethane resin according to [1] or [2], the polyol is a polyoxypropylene diol.
[4] The polyurethane resin according to [1], the reaction of the mixture (a) of a monool and a polyol and the polyisocyanate (b) is carried out in a range of NCO/OH equivalent ratio of 1.6 to 2.5.
[5] The polyurethane resin according to any one of [1] to [4], the reaction of said prepolymer and the compound of the formula I is carried out in a range of $NCO/NH_2$ equivalent ratio of 0.6 to 1.2
[6] A production process of a polyurethane resin, characterized in that
(1) a urethane prepolymer obtained by reacting
(a) a mixture of a monool and a polyol, having on average 1.3 to 2.1 of terminal hydroxyl groups, and
(b) a polyisocyanate, and
(2) a compound having a crosslinkable silyl group, an imino group and an amino group in a molecule, of the following formula I:

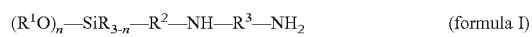
$$(R^1O)_n\text{—}SiR_{3-n}\text{—}R^2\text{—}NH\text{—}R^3\text{—}NH_2 \quad \text{(formula I)}$$

wherein R represents a methyl group or an ethyl group,
$R^1$ represents a methyl group or an ethyl group,
$R^2$ represents a hydrocarbon group having 2-10 carbon atoms,
$R^3$ represents a hydrocarbon group having 2-10 carbon atoms,
are reacted.

Effects of the Invention

The polyurethane resin of the invention may be preferably used as an adhesive since the polyurethane resin is excellent in adhesion, physical properties, handling property and storage stability. In addition, the polyurethane resin may be preferably used as an adhesive with no solvent since the polyurethane resin has low viscosity. Further, according to the production process of the invention, a step of inactivating an amino group is not required. Accordingly, the above-mentioned polyurethane resin may be inexpensively and easily produced.

EMBODIMENTS OF THE INVENTION

The embodiments of the invention are explained below.
The present invention is a polyurethane resin obtained by reacting
(1) a urethane prepolymer obtained by reacting
(a) a mixture of a monool and a polyol, having on average 1.3 to 2.1 of terminal hydroxyl groups, and
(b) a polyisocyanate, and (2) a compound having a crosslinkable silyl group, an imino group and an amino group in a molecule, of the following formula I:

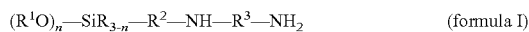

(formula I)

wherein R represents a methyl group or an ethyl group,
$R^1$ represents a methyl group or an ethyl group,
$R^2$ represents a hydrocarbon group having 2-10 carbon atoms,
$R^3$ represents a hydrocarbon group having 2-10 carbon atoms.

The polyurethane resin of the invention has on average 1.3 to 2.1 of the terminal hydroxyl groups of the mixture (a) of a monool and a polyol. Accordingly, the polyurethane resin is excellent in physical properties and stabilities.

In the invention, the average number of terminal hydrolyzable silyl groups was measured according to JIS K 1557-1: 2007.

In the invention, the above-mentioned mixture (a) of a monool and a polyol may be obtained by mixing preferably 20 to 80 wt. %, more preferably 35 wt. % to 65 wt. % of a monool and preferably 20 to 80 wt. %, more preferably 35 wt. % to 65 wt. % of a polyol, based on the whole amount of the mixture (a), from the viewpoint of physical properties and stability.

Examples of the above-mentioned monool include a polyoxyalkylene monool, a polyester monool, a polyether/ester monool, a higher saturated monool and a monool having an ethylenically unsaturated double bond. One kind or a mixture of two or more kinds thereof may be used.

Examples of the above-mentioned monool include a high molecular polyoxyalkylene-based monool containing one hydroxyl group in a molecule in which an alkylene oxide such as ethylene oxide, propylene oxide, butylene oxide and tetrahydrofuran is ring-opening addition polymerized with an alkyl compound containing one active hydrogen as an initiator.

Example of the above-mentioned polyester monool include a modified product of a known polyester polyol in which a terminal hydroxyl group is alkylated, a lactone-based polyester monool obtained by subjecting a cyclic lactone compound to a ring-opening addition copolymerization reaction or an esterification reaction with a monohydroxy compound as an initiator, and an ester monool obtained from a polyhydric alcohol and a saturated fatty acid, (meth)acrylic acid, cinnamic acid or a carboxylic acid having an ethylenically unsaturated double bond such as oleic acid, linoleic acid and linolenic acid which is a higher unsaturated fatty acid having 10 or more carbon atoms.

Example of the above-mentioned polyether/ester monool include a polyoxyalkylene fatty acid ester monool obtained by addition polymerizing said (mono)alkylene oxide to a fatty acid ester monool.

Among them, a polyoxyalkylene monool, in particular, polyoxypropylene monool is preferred from the viewpoint of versatility and safety.

The above-mentioned monool is commercially available, for example, as PML-S1006 from Asahi Glass Co., Ltd.

Example of the above-mentioned polyol include polyether polyols obtained by addition polymerizing propylene oxide or alkylene oxides composed of propylene oxide and ethylene oxide to a polyhydric alcohol such as ethylene glycol, propylene glycol, glycerin, trimethylol propane, pentaerythritol, sorbitol and sucrose; ethylene glycol, propylene glycol and oligoglycols thereof; butylene glycol, hexylene glycol, polytetramethylene ether glycols; polycaprolactone polyols; polyester polyols such as polyethylene adipate; polybutadiene polyols; higher fatty acid esters having a hydroxyl group such as castor oil; polymer polyols obtained by grafting a vinyl monomer to polyether polyols or polyester polyols. One kind or a mixture of two or more kinds thereof may be used.

A polyoxyalkylene polyol as an adduct of propylene oxide or of propylene oxide and ethylene oxide is preferred as the above-mentioned polyol from the viewpoint of workability, curing property and physical properties.

In particular, a polyoxyalkylene polyol as an adduct of propylene oxide, i.e., polyoxypropylene polyol, in particular, polyoxypropylene diol, is preferred for practical use as the above-mentioned polyol.

These polyols may be produced by the conventionally known process. Specifically, examples of the process include a process described in JP 3076032 B.

The above-mentioned polyoxyalkylene polyol is commercially available, for example, as PML-4011F, PML-4013F from Asahi Glass Co., Ltd.

In the invention, the above-mentioned monool preferably has a number-average molecular weight (Mn) of 500 or more, more preferably 1000 or more from the view point of cost and viscosity of the monool. The above-mentioned monool preferably has a number-average molecular weight (Mn) of 25000 or less, more preferably 10000 or less from the view point of viscosity of the resulting polyurethane resin.

The above-mentioned polyol preferably has a number-average molecular weight (Mn) of 500 or more, more preferably 1000 ore more from the view point of physical properties of the resulting polyurethane resin. The above-mentioned monool preferably has a number-average molecular weight (Mn) of 30000 or less, more preferably 20000 or less, from the view point of viscosity of the resulting polyurethane resin.

In the invention, a number-average molecular weight (Mn) and an average-weight molecular weight (Mw) are polystyrene-converted values measured by gel permeation chromatography (GPC).

In the invention, the polyisocyanate (b) is reacted with the mixture (a) of the above-mentioned monool and polyol.

Examples of the above-mentioned polyisocyanate include an aromatic polyisocyanate such as tolylene diisocyanate, 4,4'-diphenylmethane diisocyanate, xylylene diisocyanate and tolidine diisocyanate, an alicyclic polyisocyanate such as dicyclohexylmethane diisocyanate, isophorone diisocyanate, isopropylidene bis(4-cyclohexylisocyanate), hydrogenated xylylene diisocyanate, cyclohexyl diisocyanate and isophorone diisocyanate, an aliphatic polyisocyanate such as hexamethylene diisocyanate, lysin diisocyanate, 2,2,4- and 2,4,4-trimethyl hexamethylene diisocyanate. Among them, an aliphatic polyisocyanate and an alicyclic polyisocyanate are preferred from the viewpoint of yellowing of the resulting polyurethane resin.

The above-mentioned polyisocyanate is commercially available, for example, as Desmodur I (IPDI) and Desmodur H (HDI) from Bayer. In the invention, the mixture (a) of a monool and a polyol is preferably reacted with the polyisocyanate (b) in an NCO/OH equivalent ratio of 1.6 to 2.5, more preferably 1.8 to 2.2. It is advantageous from the viewpoint of physical properties and stability of the polyurethane resin that the above-mentioned mixture (a) and the polyisocyanate (b) are reacted in the NCO/OH equivalent ratio of the above-mentioned range.

The reaction may be usually carried out under a condition of normal temperature to 90° C. (for example, from 60 to 90° C.) for 1 to 48 hours, if necessary, in the presence of a suitable reaction catalyst (e.g., an organic tin-based catalyst such as dibutyltin dilaurate, a bismuth-based catalyst such as bismuth octylate, a tertiary amine-based catalyst such as 1,4-diaza[2.2.2]bicyclooctane).

The above-mentioned urethane prepolymer (1) is a prepolymer containing an isocyanate group at the terminal (hereinafter, which is referred to as an NCO-terminated prepolymer). The terminal NCO content of the prepolymer is preferably 0.2 to 6.0 wt. %, more preferably 0.4 to 4.5 wt. %, from the viewpoint of storage stability of the prepolymer and flexibility of a cured product.

The above-mentioned NCO-terminated prepolymer usually has a number-average molecular weight of 500 to 30000, preferably 1000 to 20000 from the viewpoint of handling of the polyurethane resin.

The polyurethane resin of the invention may be produced by reacting the above-mentioned urethane prepolymer (1) with the compound (2) of the following formula I:

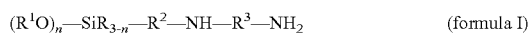
(formula I)

wherein R represents a methyl group or an ethyl group, preferably a methyl group,
$R^1$ represents a methyl group or an ethyl group, preferably a methyl group,
$R^2$ represents a hydrocarbon group having 2-10 carbon atoms, preferably an alkylene group,
$R^3$ represents a hydrocarbon group having 2-10 carbon atoms, preferably an alkylene group.

Examples of the above-mentioned compound of the formula I include aminoethylaminopropylmethyldimethoxysilane, aminoethylaminopropylmethyltrimethoxysilane, aminoethylaminopropylmethyldiethoxysilane and aminoethylaminopropylmethyltriethoxysilane. Among them, aminoethylaminopropylmethyldimethoxysilane and aminoethylaminopropylmethyltrimethoxysilane are preferred from the viewpoint of physical properties.

The above-mentioned compound of the formula I is commercially available, for example, as KBM-602 and KBM-603 from Shin-Etsu Chemical Co., Ltd.

The polyurethane resin of the invention may be preferably obtained by reacting the above-mentioned urethane prepolymer (1) with the above-mentioned compound (2) of the formula I in an $NCO/NH_2$ equivalent ratio of 0.6 to 1.2, more preferably 1.0 to 1.2.

It is advantageous from the viewpoint of stability that the above-mentioned urethane prepolymer (1) is reacted with the above-mentioned compound of the formula I in the $NCO/NH_2$ equivalent ratio of the above-mentioned range.

If necessary, the polyurethane resin of the invention may be mixed with a usual additive component such as a filler, a plasticizer, a tackifier, a thixotropic agent, an anti-aging agent, an absorbent, an anti-sag agent, a leveling agent, a ultraviolet absorber, an antioxidant, a tackifier and a curing catalyst to produce a curable composition which may be used for an adhesive, a sealing material, an elastomer material (a urethane-based coating waterproofing material, a urethane-based exterior painting material, a urethane-based coating floor material, a urethane-based electric wire coating material, a urethane-based elastomer molding material) and the like.

Examples of the above-mentioned filler include a ground calcium carbonate, a calcium carbonate treated with a fatty acid, a magnesium carbonate, diatom earth, a calcined clay, clay and balloons such as a glass bead, shirasu baloon, a glass balloon, a silica balloon, a plastic balloon and a powder-coated plastic balloon, talc, titanium oxide, bentonite, organic bentonite, ferric oxide, zinc oxide, a hydrogenated castor oil, asbestos, a fiberglass and the like. Among them, a ground calcium carbonate is preferred. If the polyurethane resin of the present invention is used to produce a curable composition, the curable composition may preferably contain a filler in an amount of 0 to 70 wt. % based on the whole amount of the curable composition.

Examples of the above-mentioned plasticizer include a phthalate such as dioctylphthalate, dibutyl phthalate and butyl benzyl phthalate; an aliphatic carboxylate ester such as dioctyl adipate, isodecyl succinate, dibutyl sebacate and butyl oleate; glycol esters such as a pentaerythritol ester; a phosphate such as dioctyl phosphate, trioctyl phosphate and tricresyl phosphate; an epoxy plasticizers such as epoxidized bean oil and epoxy benzyl stearate; and a chlorinated paraffin. Among them, diisononyl phthalate is preferred. If the polyurethane resin of the present invention is used to produce a curable composition, the curable composition may preferably contain a plasticizer in an amount of 0 to 70 wt. % based on the whole amount of the curable composition.

Examples of the above-mentioned tackifier include an aminoalkoxysilane such as N-(β-aminoethyl)-N'-(γ-trimethoxysilylpropyl)-ethylenediamine and N-(β-aminoethyl)-γ-aminopropyltrimethoxysilane; an epoxyalkoxysilane such as vinyltriethoxysilane, vinyltrimethoxysilane, γ-glycidoxypropyltrimethoxysilane, γ-glycidoxypropyltriethoxysilane, β-(3,4-epoxycyclohexyl)ethyltrimethoxy silane. Among them, an aminosilane compound is preferred. If the polyurethane resin of the present invention is used to produce a curable composition, the curable composition may preferably contain a tackifier in an amount of 0 to 10 wt. % based on the whole amount of the curable composition.

Examples of the curing catalyst include tin octoate, tin naphthenate, tin stearate, dibutyltin dioctoate, dibutyltin dilaurate, dioctyltin diversatate, dibutyltin bistriethoxysilicate, dibutyltin dioleylmalate, dibutyltin diacetate, 1,1,3,3-tetrabutyl-1,3-dilauryloxycarbonyl-distannoxane, dibutyltin oxybisethoxysilicate, dibutyltin oxide, a reaction product of dibutyltin oxide and a phthalic acid ester, a reaction product of dibutyltin oxide and a maleic acid diester, and dibutyltin diacetylacetonate. Examples of other organometallic compounds include carboxylic salts (for example, octylic acid salt) of bismuth, barium, calcium, indium, titanium, zirconium, calcium, zinc, iron, cobalt and lead, for example, octyl acid bismuth, octyl acid calcium and the like. They may be used alone or in combination of two or more kinds.

The curable composition of the polyurethane resin of the invention is composed of the above-mentioned components, and may be produced by mixing the components, for example, using a high-speed stirring mixer, a pearl mil and the like.

The curable composition may be used as one-pack type in which the polyurethane resin and said components are collectively mixed, two-pack type composed of a base material containing the polyurethane resin and a curing agent containing a curing catalyst, or three-pack type further comprising a toner composed of a coloring agent and a plasticizer as a component other than the above-mentioned components.

When the curable composition of the invention is used as a two-pack type, the above-mentioned base material and curing agent can be preferably weighed and mixed in at least one weight ratio selected from the range of 100:0.5 to 20, more preferably 100:1 to 15, particularly preferably 100:5 to 10 and cured for use.

EXAMPLES

Hereinafter, the present invention will be described in more detail by Examples and the comparative examples. However, the present invention is not limited thereto.

[Production of Polyurethane Resin]

Example 1

458 g of polyoxypropylene monool having a number-average molecular weight of 5000 (PML-S-1005 from Asahi Glass Co., Ltd), 462 g of polyoxypropylene diol having a number-average molecular weight of 13000 (PML-4013 from Asahi Glass Co., Ltd) and 53 g of isophorone diisocyanate (Desmodur I from Sumitomo Chemical Bayer Corporation) were mixed. The mixture was reacted at 90° C. for 24 hours to obtain a polyurethane prepolymer.

21 g of aminoethylaminopropylmethyldimethoxysilane (KBM-602 from Shin-Etsu Co., Ltd.) was charged to 515 g of the prepolymer and stirred at 30° C. for 30 minutes. Subsequently, 7.3 g of aminopropylmethyldimethoxysilane (KBM-902 from Shin-Etsu Co., Ltd.) and 0.3 g of methanol were charged to the prepolymer. After stirring at 30° C. for 30 minutes, a polyurethane resin was obtained.

Example 2

458 g of polyoxypropylene monool having a number-average molecular weight of 5000 (PML-S-1005 from Asahi Glass Co., Ltd), 462 g of polyoxypropylene diol having a number-average molecular weight of 13000 (PML-4013 from Asahi Glass Co., Ltd) and 53 g of isophorone diisocyanate (Desmodur I from Sumitomo Chemical Bayer Corporation) were mixed. The mixture was reacted at 90° C. for 24 hours to obtain a polyurethane prepolymer.

21 g of aminoethylaminopropylmethyltrimethoxysilane (KBM-603 from Shin-Etsu Co., Ltd.) was charged to 515 g of the prepolymer and stirred at 30° C. for 30 minutes. Subsequently, 7.3 g of aminopropylmethyldimethoxysilane (KBM-902 from Shin-Etsu Co., Ltd.) and 0.3 g of methanol were charged to the prepolymer. After stirring at 30° C. for 30 minutes, a polyurethane resin was obtained.

Comparative Example 1

500 g of polyoxypropylene diol having a number-average molecular weight of 10000 (PML-4011 from Asahi Glass Co., Ltd) and isophorone diisocyanate (Desmodur I from Sumitomo Chemical Bayer Corporation) were reacted in an NCO/OH equivalent ratio of 2.0 at 90° C. for 42 hours to obtain a polyurethane prepolymer.

51.3 g of aminoethylaminopropylmethyldimethoxysilane (KBM-602 from Shin-Etsu Chemicals Co., Ltd.) was charged to 444 g of the prepolymer. After adding 91.5 g of 2-ethylhexylacrylate to the prepolymer and stirring at 50° C. for 10 days, a polyurethane resin was obtained.

Comparative Example 2

210 g of polyoxypropylene diol having a number-average molecular weight of 10000 (PML-4011 from Asahi Glass Co., Ltd) and isophorone diisocyanate (Desmodur I from Sumitomo Chemical Bayer Corporation) were reacted in an NCO/OH equivalent ratio of 2.0 at 90° C. for 42 hours to obtain a polyurethane prepolymer having a viscosity of 20000 mPa·s at 20° C.

8 g of aminoethylaminopropylmethyldimethoxysilane (KBM-602 from Shin-Etsu Chemicals Co., Ltd.) was charged to 104 g of the prepolymer. After stirring at 30° C. for 30 minutes, a polyurethane resin which has a high viscosity and cannot be stirred was obtained.

[Preparation PF Two-pack Type Curable Composition]

Examples 3 and 4, and Comparative Example 3

Base Material

The materials of weights shown in Table 1 are charged into a mixing agitator equipped with a heating unit and a decompression unit and stirred for 30 minutes. Subsequently, mixing and stirring are conducted at 60° C. for 30 minutes and then conducted under reduced pressure for 20 minutes. After that, a base material was obtained.

Curing Agent

A curing catalyst and a calcium carbonate are mixed in the weights shown in Table 1 at room temperature. After that, a curing agent was obtained by mixing and stirring for 10 minutes.

The base material and the curing agent prepared as described above were mixed at 100:10 (weight ratio) to obtain a curable composition.

TABLE 1

| raw material | | Example 3 | Example 4 | Comparative Example 3 |
|---|---|---|---|---|
| polyurethane resin | Example 1 | 700 | | |
| | Example 2 | | 700 | |
| | Comparative Example 1 | | | 700 |
| balloon (*1) | | 100 | 100 | 100 |
| non-surface-treated calcium carbonate (*2) | | 1180 | 1180 | 1180 |
| surface-treated calcium carbonate (*3) | | 350 | 350 | 350 |
| plasticizer (*4) | | 740 | 740 | 740 |
| light stabilizer (*5) | | 1 | 1 | 1 |
| antioxidant (*6) | | 4 | 4 | 4 |
| ultraviolet absorber (*7) | | 7 | 7 | 7 |
| catalyst 1 (*8) | | 3 | 3 | 3 |
| catalyst 2 (*9) | | 5 | 5 | 5 |
| catalyst 3 (*10) | | 4.5 | 4.5 | 4.5 |
| total | | 3094.5 | 3094.5 | 3094.5 | unit: [g]
(*1) from Matsumoto Yushi Co., Ltd, an average particle diameter of 60 μm, Tg 140° C.
(*2) a ground calcium carbonate, "Whiten SB" from Shiraishi Calcium Ltd., an average particle diameter of 3.7 μm
(*3) "Calfine 500" from Maruo Calcium Co., Ltd, a primary particle diameter of 0.05, a BET specific surface area of 17 m²/g
(*4) DINP, "DINP" from New Japan Chemical Co., Ltd.
(*5) hindered amine light stabilizer (HALS), "tinuvin123"
(*6) "AO-60P" from Adeka Co., Ltd.
(*7) "JF 79" from Johoku Chemical Co., Ltd.
(*8) divalent tin-based catalyst "U-28"
(*9) tetravalent tin-based catalyst "C-501"
(*10) amine-based catalyst, "Amine BB" from Nichiyu Co., Ltd.

As to each polyurethane resin and each curable composition prepared as described above, the following performance test was conducted. The results are shown in Tables 2 and 3.

[Method of Performance Test]

1. Viscosity

The viscosity of the polyurethane resin prepared as described above was measured using a rotational viscometer (a digital viscometer from Brookfield) at 20° C.

2. Storage Stability

The storage stability of the polyurethane resin prepared as described above was observed in a constant temperature and humidity chamber at 35° C.×90% RH for 24 hours.

3. Physical Properties

A primer (name: Primer US-3, from Sunstar Giken Co., Ltd.) was applied to A5052P aluminium board (50×50×5 mm) defined in JIS H 4000 and a curable composition prepared as described above was deposit. After curing (condition: 20° C.×7 days+50° C.×7 days), the 50% tensile stress [N/mm²], the maximum tensile stress [N/mm²] and the elongation [%] at maximum load were measured according to JISA1439 5.20 "tensile/adhesive strength test" (2004) after initial curing (20° C.×7 days+50° C.×7 days).

TABLE 2

| item | Example 1 | Example 2 | Comparative Example 1 | Comparative Example 2 |
|---|---|---|---|---|
| elongation [%] | 70,000 | 50,000 | 200,000 | 1,000,000 |
| storage stability (35° C. × 90% RH × 24 hours) | no change | no change | no change | gelled after 4 hours |

TABLE 3

| item | Example 3 | Example 4 | Comparative Example 3 |
|---|---|---|---|
| viscosity at 20° C. [mPa · s] | 700 | 650 | 650 |
| 50% tensile stress [N/mm²] | 0.13 | 0.14 | 0.30 |
| maximum tensile stress [N/mm²] | 0.51 | 0.46 | 0.75 |

In the above-mentioned result, the polyurethane resins according to the invention produced in Examples 1 and 2 have a viscosity of 50,000 to 70,000 mPa·s. Polyurethane resins not according to the invention produced in the comparative examples 1 and 2 have a viscosity of 200,000 or more. Therefore, the polyurethane resin of the invention is excellent in handling. The polyurethane resins according to the invention produced in Examples 1 and 2 have good storage stability. The Polyurethane resin produced in the comparative example 2 does not have sufficiently storage stability. The curable compositions produced using polyurethane resin according to the invention in Examples 3 and 4 have a 50% tensile stress of 0.14 N/m² or less and a maximum tensile stress of 0.51 N/mm² or less. The curable composition produced using polyurethane resin not according to the invention in the comparative example 3 has a 50% tensile stress of 0.30 N/m² and a maximum tensile stress of 0.75 N/mm². Thus, an elastomer having a lower modulus may be produced using a polyurethane resin according to the invention.

The invention claimed is:

1. A polyurethane resin obtained by reacting
   (1) a urethane prepolymer obtained by reacting, in a range of NCO/OH equivalent ratio of 1.6 to 2.5,
     (a) a mixture of, based on the whole amount of the mixture, 20 to 80 wt. % of a monool and 80 to 20 wt. % of a polyol, having on average 1.3 to 2.1 of terminal hydroxyl groups, and
     (b) a polyisocyanate, and
   (2) a compound of the following formula I:

$(R^1O)_n—SiR_{3-n}—R^2—NH—R^3—NH_2$ (formula I)

wherein R represents a methyl group or an ethyl group,
   R1 represents a methyl group or an ethyl group,
   R2 represents a hydrocarbon group having 2-10 carbon atoms,
   R3 represents a hydrocarbon group having 2-10 carbon atoms, and
   n is 1, 2, or 3.

2. The polyurethane resin according to claim 1, the polyol has a number-average molecular weight (Mn) of 500 to 30000.

3. The polyurethane resin according to claim 2, wherein the polyol is a polyoxypropylene diol.

4. The polyurethane resin according to claim 1, the polyol is a polyoxypropylene diol.

5. The polyurethane resin according to claim 1, the reaction of said prepolymer and the compound of the formula I is carried out in a range of NCO/NH₂ equivalent ratio of 0.6 to 1.2.

6. A production process of a polyurethane resin, characterized in that
   (1) a urethane prepolymer obtained by reacting, in a range of NCO/OH equivalent ratio of 1.6 to 2.5,
     (a) a mixture of, based on the whole amount of the mixture, 20 to 80 wt. % of a monool and 80 to 20 wt. % of a polyol, having on average 1.3 to 2.1 of terminal hydroxyl groups, and
     (b) a polyisocyanate, and
   (2) a compound of the following formula I:

$(R^1O)_n—SiR_{3-n}—R^2—NH—R^3—NH_2$ (formula I)

wherein R represents a methyl group or an ethyl group,
   R1 represents a methyl group or an ethyl group,
   R2 represents a hydrocarbon group having 2-10 carbon atoms,
   R3 represents a hydrocarbon group having 2-10 carbon atoms, and
   n is 1, 2 or 3,
   are reacted.

* * * * *